Patented Dec. 16, 1924.

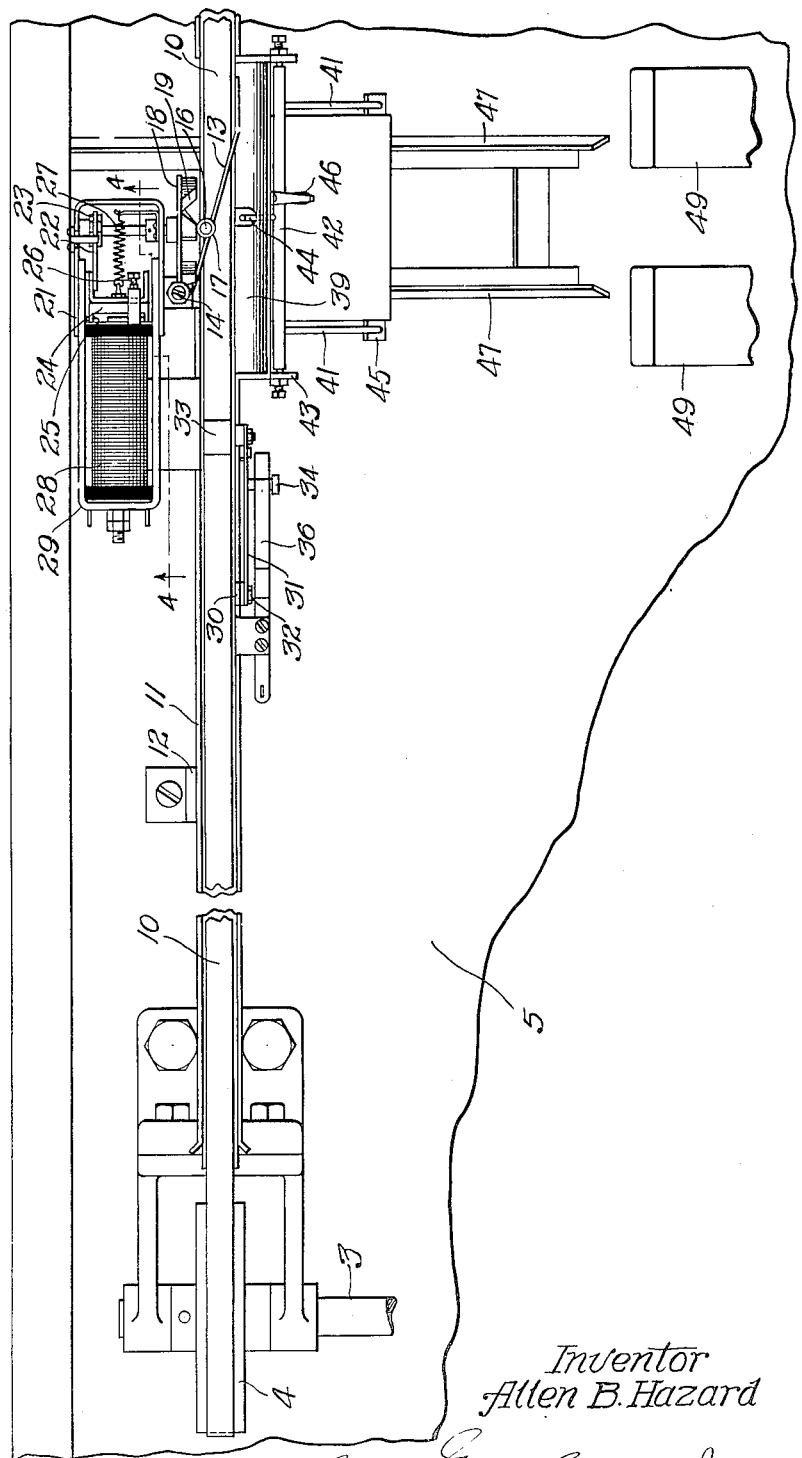

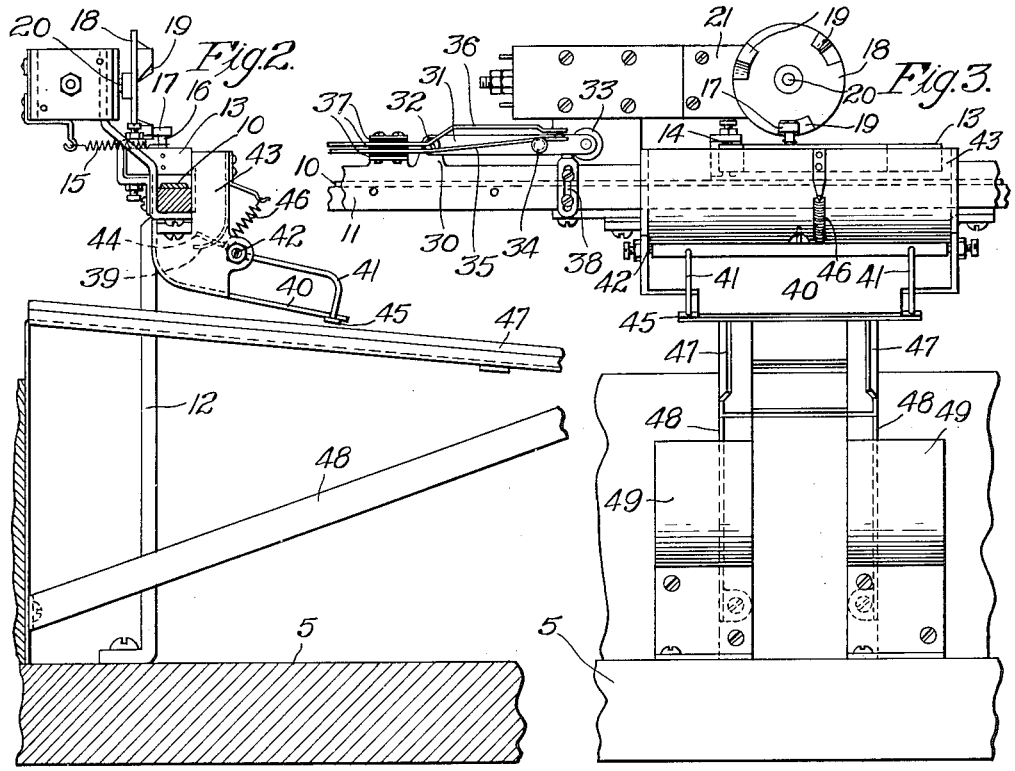
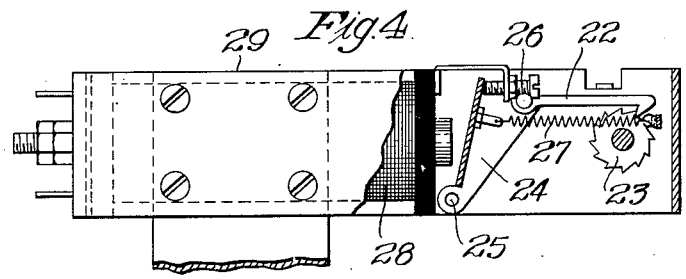
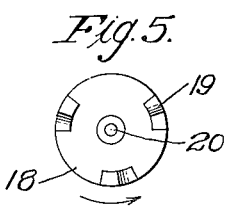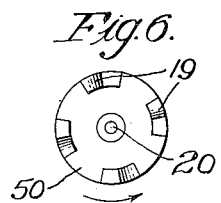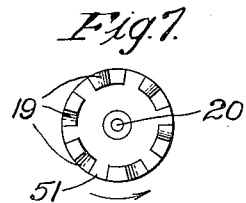

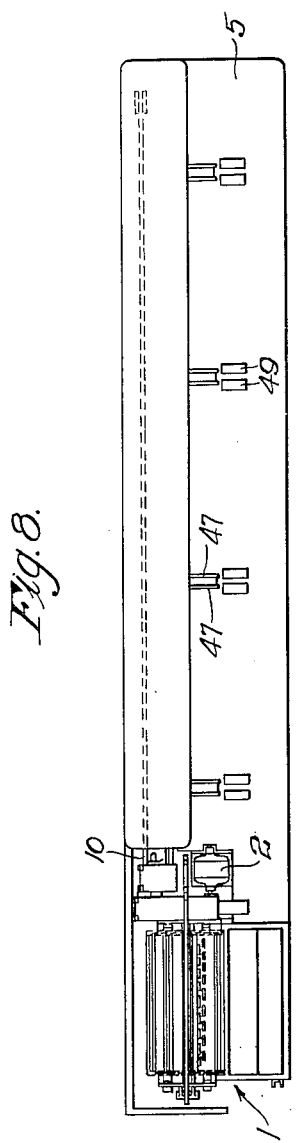
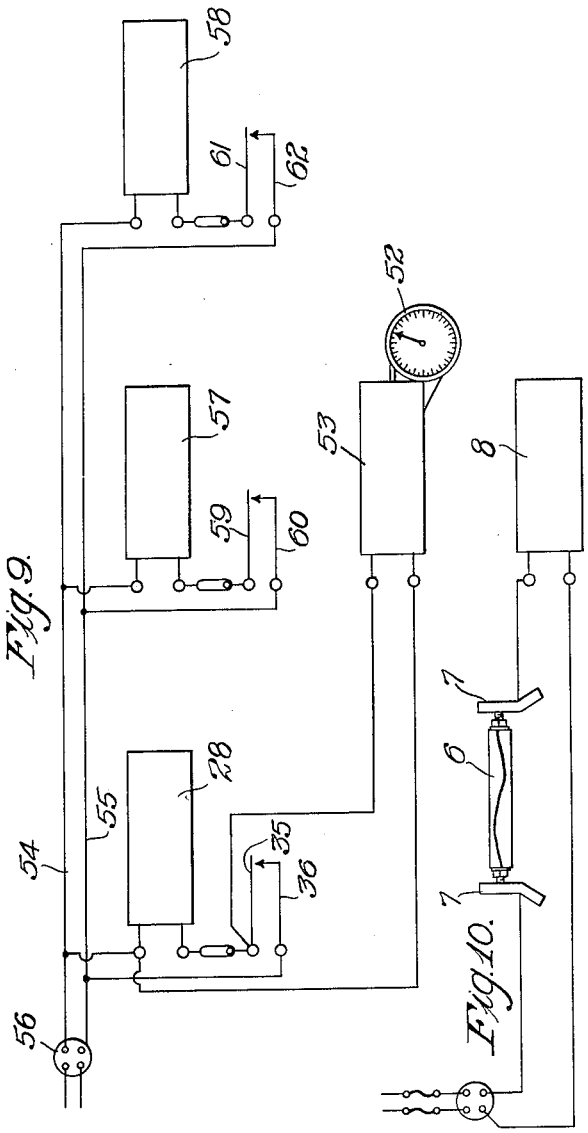

1,519,613

UNITED STATES PATENT OFFICE.

ALLEN B. HAZARD, OF BERWYN, ILLINOIS, ASSIGNOR TO WESTERN ELECTRIC COMPANY, INCORPORATED, OF NEW YORK, N. Y., A CORPORATION OF NEW YORK.

DISTRIBUTING MECHANISM.

Original applications filed September 1, 1915, Serial No. 48,513, and November 8, 1917, Serial No. 200,916. Divided and this application filed January 16, 1920. Serial No. 351,971.

*To all whom it may concern:*

Be it known that I, ALLEN B. HAZARD, a citizen of the United States, residing at Berwyn, in the county of Cook and State of Illinois, have invented new and useful Improvements in Distributing Mechanism, of which the following is a full, clear, concise, and exact description, reference being had to the accompanying drawing, forming a part of this specification.

This invention relates to improvements in distributing mechanism.

One object of the invention is to provide improved means for distributing articles to a plurality of different points. Another object is to provide means whereby articles may be automatically removed from an endless conveyor to a plurality of points in predetermined quantities. A further object is to accomplish the foregoing results by electrically-actuated mechanism controlled by the articles themselves.

This application is a division of my co-pending application, Ser. No. 200,916, filed November 8, 1917, and now Patent 1,346,314, July 13, 1920, said application in turn being a division of my earlier application 48,513, filed September 1, 1915, which issued January 29, 1918, as Patent 1,254,690.

The preferred embodiment of the distributing mechanism disclosed herein and in said earlier applications constitutes part of a fuse testing machine. However, the invention is not limited to this particular use, but may be adapted to a number of other uses and embodied in other mechanisms.

In the accompanying drawings:—

Figure 1 is a top plan view of part of the distributing mechanism;

Fig. 2 is a side elevation thereof, the parts being shown in section;

Fig. 3 is a front elevation thereof;

Fig. 4 is an enlarged elevation, partly in section, of a portion of the distributing mechanism, as seen on the line 4—4 of Fig. 1.

Figs. 5, 6, and 7 are views of three distributer cam disks;

Fig. 8 is a top plan view of the entire machine, with certain details omitted;

Fig. 9 is a diagram of the distributing mechanism circuit; and

Fig. 10 is a diagram of the testing circuit.

The machine as a whole is designed to test fuses, and distribute them in equal numbers before a number of operators who pack them.

The fuses are dumped promiscuously into a hopper in the machine, and are thereafter automatically tested by passing them one at a time between electrical contacts, the imperfect fuses being rejected and the perfect fuses fed to the distributing mechanism.

The machine as a whole is indicated by reference numeral 1 (Fig. 8), and is driven by a suitable motor 2. The distributer is operated from said motor by suitable gearing which drives the shaft 3 on which the pulley 4 is mounted. Said distributer is mounted on a bench or table 5. The individual fuses 6, one of which is shown in Fig. 10, are passed between the contacts 7—7, one of which is yieldingly mounted. If the fuse is of the required length, and if the fuse circuit is intact, said contacts will be bridged and the magnet 8 will be energized. The energization or de-energization of this magnet controls the mechanism for separating the imperfect from the perfect fuses. The latter are delivered to a conveyor in the form of an endless belt 10, passing over the pulley 4 and over a second pulley—not shown—at the opposite end.

The channel 11, within which the distributer belt 10 travels, is elevated above the table on a plurality of supports or brackets 12. The bench is long enough to permit several operators to stand or be seated side by side to inspect and pack the fuses delivered to them from the belt. In the present instance provision is made for four operators, although the number may be varied. Mechanism is provided to throw off the fuses at four different points as they travel along the belt, whereby they may roll down to a point within easy reach of each operator. In order to supply each operator with the same number of fuses to inspect and pack, the following mechanism is provided:

At each of the four points where it is desired to roll the fuses off the belt, a deflector 13 is provided, the latter being pivotally mounted on a pin 14 and arranged to be moved to the position shown in Fig. 1, whereby any fuse that strikes it is crowded off the belt and rolls down an incline hereinafter described. However, each deflector is normally withdrawn from the path of the fuses by a spring 15, which engages a pin 16 on the deflector, said pin carrying a roller 17. Only one out of every four fuses which reaches the first deflector is thrown off and rolled down to the operator, whereas it is necessary to throw off one out of every three fuses which reaches the second deflector. Similarly, one out of every two fuses which reaches the third deflector must be thrown off the belt, and all of the fuses which reach the fourth deflector must be thrown off. This arrangement ensures an exactly uniform distribution of fuses to each of the operators, where four are employed. Where a different number of operators are employed a readjustment, or slightly different order for ejecting said fuses, may be employed.

The mechanism for projecting the first deflector consists of a rotary disk 18, having three projections or cams 19 thereon arranged to engage the roller 17. Said disk is mounted on a shaft 20, mounted in a suitable frame 21 and rotated by a pawl and ratchet mechanism 22, 23. The ratchet has twelve teeth in the construction shown. The pawl is operated by an armature 24, which is pivoted at the point 25, said armature being normally held against an adjustable stop 26 by means of a spring 27. It is attracted, however, by an electromagnet 28, supported by a suitable frame 29. Whenever the magnet is energized the ratchet is rotated one tooth, corresponding to one-twelfth of a revolution, and, since there are three cams on the disk 18, every fourth energization of the electromagnet results in swinging the deflector 13 about its pivot 14 against the action of the spring 15, whereupon the deflector is projected across the path of the passing fuse.

The circuit of the electromagnet is normally open, but is controlled by the passing of the fuses. The side wall of the channel 11 is extended at a point adjacent the deflector to form a supporting plate 30, to which a lever 31 is pivoted at the point 32. Said lever carries a roller 33 at its free end, which roller is adapted to be raised by every passing fuse, thereby causing a projecting stud 34, carried by said lever, to raise the lower spring contact 35 against the upper spring contact 36, thereby closing the circuit of the electromagnet. Said contacts are mounted between suitable insulating blocks 37, and are connected in the circuit illustrated diagrammatically in Fig 9, hereinafter described. Every time a fuse passes the electromagnet is energized, as previously explained, whereby every fourth fuse is crowded off the belt by the deflector. An adjustable stop 38 is provided, which determines the lowermost position of the roller 33.

The fuses thrown off by the deflector (see Fig. 2) first strike a sheet metal guide 39, from which they drop on to and roll down a sheet metal incline 40, at the end of which they are obstructed by the bent ends of a pair of guard rods 41, the latter being pivotally mounted on a supporting shaft 42 supported in the side walls 43 of the receptacle, of which the incline 40 forms the bottom. A rearwardly projecting arm 44 is also mounted on the shaft 42 and projects through a suitable opening in the guide 39, whereby the guard rods 41 are tripped or raised momentarily whenever a fuse falls from the distributer belt. The ends of the guard rods normally rest on a cross bar 45, against which they are held by the action of the spring 46. It will be seen that the fuses are obstructed by the guard rods 41, but are released one at a time, each fuse so obstructed being released by the succeeding fuse as it falls off the belt.

The fuses thus released roll down a pair of rails 47 made of sheet metal and supported at the rear of the bench. Said rails are braced by diagonal braces 48. At the forward ends they terminate adjacent a pair of semi-circular receptacles 49 (see Fig. 8), which catch the fuses that roll down the incline and from which the operator may conveniently lift them, in view of the fact that said receptacles are spaced apart enough to enable the operator to grasp the fuses by the middle.

The mechanism for operating the second and third deflectors is substantially identical with the mechanism just described, with the exception of the number of cams on the disk 18, and therefore will not be described in detail. The succeeding disks 50 and 51 (see Figs. 6 and 7) are provided with four and six cams, respectively, instead of three. The one having four cams, therefore, throws off every third fuse, and the one having six cams throws off every second fuse. The last deflector is always in position, and throws off every fuse.

A counter 52 is provided for counting all the good fuses, that is, the ones which pass the first roller. It is operated by an electromagnet 53 (Fig. 9), arranged in parallel with the electromagnet 28 and energized every time a fuse passes. In the diagram the circuit to the mains 54, 55 is closed by a suitable switch 56. The electromagnets 28, 57, 58, which actuate the deflectors previously described, are connected across the circuit in parallel with each other. The circuit to the electromagnet 28 is closed by the resilient contacts 35, 36, previously described. A similar pair of contacts 59, 60 closes the circuit to the electromagnet 57, and a third pair 61, 62 closes the circuit to the electromagnet 58. The electromagnet 53, for operating the counter, is connected in parallel with the electromagnet 28, as previously stated, but is in series with the contacts 35, 36, whereby the closing of the said contacts energizes both electromagnets. The counter is indicated only diagrammatically, and may be of any suitable type. It is obvious that where the number of operators employed is to be increased or decreased, the number of electromagnets may be varied accordingly.

It will be obvious to those skilled in the art that the present invention is not limited to the particular embodiment thereof herein described in detail, as various changes may be made therein without departing from the spirit of the invention as defined in the appended claims. Furthermore, various other embodiments of the invention may be devised, applicable to other uses than the one herein described and illustrated.

I claim:—

1. In a device of the class described, a distributing mechanism comprising an endless belt conveyor, a deflector adjacent thereto, and means operable from a point in advance of said deflector and controlled by the articles to be distributed for moving said deflector across the path of said articles at predetermined intervals.

2. In a device of the class described, a belt conveyor, a plurality of deflectors arranged to be projected into the path of said conveyor, and electromagnetic means for projecting said deflectors.

3. Deflecting mechanism comprising a pair of contact members, means for closing a circuit through said members, an electromagnet included in said circuit, pawl and ratchet mechanism operated by said electromagnet, a disk rotated by said ratchet, and a deflector moved periodically during the rotation of said disk.

4. Distributing mechanism comprising an electrically operated pawl and ratchet, a disk operated by said ratchet, cams on said disk, and a deflector operated by the latter, the number of teeth on said ratchet being a multiple of the number of cams.

5. In a distributing mechanism, an endless belt conveyor, four deflectors mounted adjacent said conveyor, electromagnetic means for moving the first three deflectors across said belt, said means comprising cam disks having three cams for the first deflector, four cams for the second deflector, and six cams for the third deflector, the fourth deflector being permanently projected across said belt.

6. In a fuse distributing mechanism, an endless belt distributer, and a plurality of deflectors adjacent thereto, the last deflector in the direction of travel of said belt being adapted to throw off every fuse that reaches it, means for operating the second to the last deflector to throw off every second fuse that reaches it, means for operating the third to throw off every third fuse that reaches it, and so on throughout the series.

7. In a distributing mechanism, a receptacle for fuses, a runway down which said fuses may roll, and means for delivering said fuses from said receptacle to said runway one at a time, said means being controlled by the fuses entering said receptacle.

8. In a distributing mechanism, an endless belt, means for deflecting articles from said belt, a storage receptacle, means for guiding said articles thereto, and an intermittently operable stop for ensuring delivery of said articles to said receptacle one at a time.

9. In a distributing mechanism, a pair of semi-circular receptacles, a pair of guide rails for delivering tubular articles thereto, means for receiving and delivering said articles to said guide rails, and releasing means cooperating with said receiving and delivering means to ensure delivery of said articles one at a time, said releasing means being controlled by the article immediately following the one released.

10. Deflecting mechanism comprising an electric circuit, a deflector, an electromagnet arranged in said circuit for operating the deflector, contacts associated with the said electromagnet and adapted to be actuated to close the circuit whenever an article is fed thereby, and controlling mechanism actuated by the said electromagnet for causing the deflector to function at predetermined times.

11. Deflecting mechanism comprising an electric circuit, a plurality of deflectors, a plurality of electromagnets connected in said circuit and adapted to operate said deflectors, circuit contacts associated with each of said electromagnets adapted to be actuated to close the circuit whenever an article is fed thereby, a counting mechanism, an additional electromagnet for operating the counting mechanism, said additional electromagnet being arranged in the circuit with one of the other electromagnets, and controlling mechanism actuated by the deflector electromagnets for causing the deflectors to function at predetermined times.

12. Deflecting mechanism comprising an electric circuit, a deflector, a counting mechanism, an electromagnet connected in said circuit and adapted to operate the deflector, an additional electromagnet being arranged in the circuit with the other electromagnet and adapted to operate the counting mechanism, contacts associated with the electromagnets and adapted to be actuated to close the circuit whenever an article is fed thereby, and controlling mechanism actuated by the deflector electromagnet for causing the deflector to function at predetermined times.

13. Deflecting mechanism comprising an electric circuit, a plurality of deflectors, a counting mechanism, a plurality of electromagnets connected in said circuit, and adapted to operate said deflectors, an additional electromagnet arranged in the circuit with one of the other electromagnets adapted to operate the counting mechanism, circuit contacts associated with each of said deflector electromagnets and adapted to be closed whenever an article is fed thereby, and controlling mechanism actuated by the deflector electromagnets for causing the deflectors to function at predetermined times.

14. A deflecting mechanism comprising an electric circuit, a plurality of deflectors, a plurality of electromagnets connected in said circuit and adapted to operate said deflectors, circuit contacts associated with each of said electromagnets adapted to be actuated to close the circuit whenever an article is fed thereby, a counting mechanism, an additional electromagnet for operating the counting mechanism, said additional electromagnet being arranged in the circuit with one of the other electromagnets, and controlling mechanism actuated by the deflector electromagnets for causing the last deflector to deflect every article that reaches it, to cause the second to the last deflector to deflect every second article that reaches it, and to cause the third deflector to deflect every third article that reaches it, and so on throughout the series.

In witness whereof, I hereunto subscribe my name this 30th day of December A. D., 1919.

ALLEN B. HAZARD.